United States Patent
Ma

(10) Patent No.: US 11,563,907 B2
(45) Date of Patent: Jan. 24, 2023

(54) PHOTO-DETECTION PIXEL CIRCUIT, A DETECTOR PANEL, AND PHOTOELECTRIC DETECTION APPARATUS

(71) Applicant: BOE TECHNOLOGY GROUP CO., LTD., Beijing (CN)

(72) Inventor: Zhanjie Ma, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 947 days.

(21) Appl. No.: 16/063,936

(22) PCT Filed: Dec. 15, 2017

(86) PCT No.: PCT/CN2017/116567
§ 371 (c)(1),
(2) Date: Jun. 19, 2018

(87) PCT Pub. No.: WO2019/000856
PCT Pub. Date: Jan. 3, 2019

(65) Prior Publication Data
US 2021/0201727 A1    Jul. 1, 2021

(30) Foreign Application Priority Data
Jun. 30, 2017 (CN) .......................... 201710523973.7

(51) Int. Cl.
*H04N 5/357* (2011.01)
*H04N 5/32* (2006.01)
*H04N 5/33* (2006.01)

(52) U.S. Cl.
CPC ............... *H04N 5/357* (2013.01); *H04N 5/32* (2013.01); *H04N 5/33* (2013.01)

(58) Field of Classification Search
CPC ............. H04N 5/357; H04N 5/33; H04N 5/32
See application file for complete search history.

(56) References Cited

U.S. PATENT DOCUMENTS 5,917,280 A * 6/1999 Burrows ............. H01L 27/3209
313/506
2005/0243031 A1 11/2005 Fish et al.
(Continued)

FOREIGN PATENT DOCUMENTS

CN    101943974 A    1/2011
CN    102081481 A    6/2011
(Continued)

OTHER PUBLICATIONS

Wang—CN 106548753 A—obtained English translation from PE2E Search (Year: 2022).*
(Continued)

*Primary Examiner* — David P Porta
*Assistant Examiner* — Jeremy S Valentiner
(74) *Attorney, Agent, or Firm* — Intellectual Valley Law, P.C.

(57) ABSTRACT

The present application discloses a pixel circuit of a photo detector panel. The pixel circuit includes a reset sub-circuit for resetting voltages at a first node and a second node, a photoelectric-conversion sub-circuit coupled to the first node and configured to convert an optical signal to a first voltage at the first node, a compensation sub-circuit coupled between the first node and the second node and configured to store the first voltage and determine a second voltage at the second node. The pixel circuit further includes an integration sub-circuit coupled to the first node and to determine a third voltage at the second node to be applied to a gate of a driving transistor to generate a current flowing
(Continued)

from an input port provided with a bias voltage to an output port. The current is substantially independent from a threshold voltage of the driving transistor and the bias voltage.

18 Claims, 3 Drawing Sheets

(56) References Cited

U.S. PATENT DOCUMENTS

| | | | |
|---|---|---|---|
| 2009/0015166 A1* | 1/2009 | Kwon | H04N 5/58 |
| | | | 315/156 |
| 2010/0097334 A1* | 4/2010 | Choi | G06F 3/0412 |
| | | | 345/173 |
| 2010/0252717 A1* | 10/2010 | Dupont | H01L 27/14609 |
| | | | 250/214 A |
| 2011/0001711 A1 | 1/2011 | Choi et al. | |
| 2011/0025898 A1* | 2/2011 | Ni | H04N 5/35509 |
| | | | 348/308 |
| 2011/0128428 A1 | 6/2011 | Takatoku et al. | |
| 2011/0193856 A1 | 8/2011 | Han | |
| 2013/0063400 A1 | 3/2013 | Ahn et al. | |
| 2013/0257506 A1* | 10/2013 | De Wit | G06G 7/184 |
| | | | 327/337 |
| 2016/0163259 A1 | 6/2016 | Kanda et al. | |
| 2016/0267843 A1 | 9/2016 | Wang et al. | |
| 2017/0126994 A1 | 5/2017 | Duan et al. | |
| 2017/0264836 A1* | 9/2017 | Mandelli | H04N 5/374 |

FOREIGN PATENT DOCUMENTS

| | | | | |
|---|---|---|---|---|
| CN | 102997993 A | | 3/2013 | |
| CN | 104867431 A | | 8/2015 | |
| CN | 105206221 A | | 12/2015 | |
| CN | 106548753 A | * | 3/2017 | ........... G09G 3/3233 |

OTHER PUBLICATIONS

International Search Report & Written Opinion dated Mar. 27, 2018, regarding PCT/CN2017/116567.
Research one InGaAs-MSM Semiconductor Infrared Detector Array, Jin Yang, Master's Thesis of Graduate School of Chinese Academy of Sciences, 2011; English translation of Abstract attached.
Extended European Search Report in the European Patent Application No. 17890838.0, dated Apr. 6, 2021.

* cited by examiner

PHOTO-DETECTION PIXEL CIRCUIT, A DETECTOR PANEL, AND PHOTOELECTRIC DETECTION APPARATUS

CROSS-REFERENCE TO RELATED APPLICATION

This application is a national stage application under 35 U.S.C. § 371 of International Application No. PCT/CN2017/116567, filed Dec. 15, 2017, which claims priority to Chinese Patent Application No. 201710523973.7, filed Jun. 30, 2017, the contents of which are incorporated by reference in the entirety.

TECHNICAL FIELD

The present invention relates to photoelectric detector technology, more particularly, to a photo-detection pixel circuit, a detector panel having the photo-detection pixel circuit thereof, and a photoelectric detection apparatus having the detector panel.

BACKGROUND

Conventional photo-detection apparatus, such as X-ray monitoring apparatus, usually includes a detector panel comprised of a plurality of detection pixels. Each detection pixel includes a detector pixel circuit for reading out an optical signal and converting the optical signal to an electrical output. FIG. 1 shows a typical photoelectric readout circuit including a photodiode D, a detection capacitor $C_{det}$, and an output-control transistor $M_i$. As the photoelectric readout circuit receives a light illumination, it outputs a detection current $I_{det}$. This photoelectric readout circuit has a drawback of low signal-to-noise ratio. In another example, FIG. 2 shows an alternative photoelectric readout circuit including the features of the circuit in FIG. 1 with a few more transistors for controlling the electrical output, aiming to enhance the signal-to-noise ratio. However, more variations of manufacturing these transistors are introduced reduces its reliability.

SUMMARY

In an aspect, the present disclosure provides a pixel circuit of a photo detector panel for generating a pixel image in a display cycle. The pixel circuit includes a reset sub-circuit respectively coupled to a first node and a second node and controlled by a first control signal to provide an initialization voltage to the first node and the second node in a reset period of the display cycle. The pixel circuit further includes a photoelectric-conversion sub-circuit coupled to the first node and configured to convert an optical signal to a first voltage at the first node. Additionally, the pixel circuit includes a driving sub-circuit comprising a bias input port configured to be provided with a bias voltage, an output port configured to output a current signal, and being controlled by a second voltage at the second node. Furthermore, the pixel circuit includes a compensation sub-circuit coupled between the first node and the second node and configured to be controlled by a second control signal to store the first voltage at the first node and connect the second node to the second terminal of the driving transistor in a compensation period of the display cycle to determine the second voltage at the second node. The second voltage is depended on the bias voltage provided to the first terminal of the driving transistor and a threshold voltage of the driving transistor. Moreover, the pixel circuit includes an integration sub-circuit coupled to the first node and controlled by a third control signal to provide a reference voltage to the first node in an integration period of the display cycle to determine a third voltage at the second node to generate a current signal to the output port in an output period of the display cycle. The current signal is substantially independent from the threshold voltage of the driving transistor and the bias voltage.

Optionally, the driving sub-circuit includes a driving transistor having a first terminal coupled to the bias input port, a second terminal coupled to the output port, and a gate terminal configured to receive the second voltage.

Optionally, the photoelectric-conversion sub-circuit includes a photodiode coupled between a first common voltage port and the first node and a pixel capacitor coupled between a second common voltage port and the first node. The first common voltage port is configured to be provided with a first common voltage set to be larger than the bias voltage. The second common voltage port is configured to be provided with a second common voltage set to be smaller than the bias voltage.

Optionally, the photodiode includes a light-sensitive spectrum range including wavelengths of X-ray.

Optionally, the photodiode includes a light-sensitive spectrum range including wavelengths of infrared or ultraviolet light.

Optionally, the integration sub-circuit includes a first transistor having a first terminal coupled to a first voltage source configured to be supplied with the reference voltage, a second terminal coupled to the first node, and a gate terminal configured to be controlled by the third control signal. The reference voltage is set to be smaller than the bias voltage.

Optionally, the third control signal is set to a turn-on level for the first transistor in each of the integration period and the output period of the display cycle and is set to a turn-off level for the first transistor in each of the reset period and the compensation period of the display cycle.

Optionally, the reset sub-circuit includes a second transistor having a first terminal coupled to the first voltage source configured to be supplied the reference voltage as an initialization voltage, a second terminal coupled to the first node, and a gate terminal configured to be controlled by a first control signal. The reset sub-circuit also includes a third transistor having a first terminal coupled to the first voltage source, a second terminal coupled to the second node, and a gate terminal configured to be controlled by the first control signal.

Optionally, the first control signal is set to a turn-on level for the second transistor and the third transistor in the reset period of the display cycle and is set to a turn-off level for the second transistor and the third transistor in each of the compensation period, the integration period, and the compensation period of the display cycle.

Optionally, the compensation sub-circuit includes a fourth transistor having a first terminal coupled to the second node, a second terminal coupled to the second terminal of the driving transistor, and a gate terminal configured to be controlled by a second control signal. The compensation sub-circuit also includes a storage capacitor having a first terminal coupled to the first node and a second terminal coupled to the second node.

Optionally, the second control signal is set to a turn-on level for the fourth transistor in the compensation period of the display cycle and is set to a turn-off level for the fourth transistor in each of the reset period, the integration period, and the output period of the display cycle.

Optionally, the pixel circuit further includes an output-control sub-circuit coupled between the second terminal of the driving transistor and the output port and configured to make the second terminal of the driving transistor at a floating state in each of the reset period, the compensation period, and the integration period of the display cycle and to control the current signal to be outputted in the output period of the display cycle.

Optionally, the output-control sub-circuit includes a fifth transistor having a first terminal coupled to the second terminal of the driving transistor, a second terminal coupled to the output port, and a gate terminal configured to be controlled by a fourth control signal.

Optionally, the fourth control signal is set to a turn-off level for the fifth transistor in each of the reset period, the compensation period, and the integration period of the display cycle and set to a turn-on level for the fifth transistor in the output period of the display cycle.

Optionally, the display cycle includes the reset period, the compensation period, the integration period, and output period.

Optionally, the current signal is proportional to a square of a difference between the third voltage and the second voltage.

In another aspect, the present disclosure provides a photo detector panel including a base substrate and a plurality of detection pixel circuits arranged in an array disposed on the base substrate. Each of the plurality of photo-detection pixel circuits is the pixel circuit described herein.

In another aspect, the present disclosure provides a photoelectric inspection apparatus comprising a photo detector panel described herein and coupled with a display panel. The display panel includes a plurality of display pixel circuits. Each of the plurality of display pixel circuits is configured to receive a current signal outputted from a corresponding one of the plurality of photo-detection pixel circuits and to generate a pixel image based on the current signal, Optionally, each of the plurality of display pixel circuits includes at least an amplifier having an input port coupled to the output port of the corresponding detection pixel circuit and an output port coupled to an input port of a light-emitting device.

In another aspect, the present disclosure provides a method of driving the pixel circuit described herein to readout a current signal converted from an optical signal in a display cycle. The method includes, in a reset period of the display cycle, supplying a first control signal at a turn-on level to control the reset sub-circuit to provide an initialization voltage to the first node and the second node. The method further includes, in a compensation period of the display cycle, detecting an optical signal by the photoelectric-conversion sub-circuit; converting the optical signal to a first voltage at the first node. Additionally, the method includes supplying a second control signal at a turn-on level to control the compensation sub-circuit to store the first voltage and connect the second node to the second terminal of the driving transistor to induce a second voltage at the second node. The second voltage is depended on a bias voltage provided to the first terminal of the driving transistor and a threshold voltage of the driving transistor. Furthermore, the method includes, in an integration period of the display cycle, supplying a third control signal at a turn-on level to control the integration sub-circuit to provide a reference voltage to the first node thereby inducing a third voltage at the second node. Moreover, the method includes generating a current signal from the first terminal of the driving transistor to the second terminal of the driving transistor. The current signal is proportional to a square of a difference between the third voltage and the second voltage.

Optionally, the method further includes, in each of the reset period, the compensation period, and the integration period of the display cycle, supplying a fourth control signal at a turn-off level to make the second terminal of the driving transistor in a floating state. Also, the method further includes, in an output period of the display cycle, supplying the fourth control signal at a turn-on level to control the output-control sub-circuit to output the current signal. The current signal is substantially independent from the threshold voltage of the driving transistor and the bias voltage.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is desired to enhance signal accuracy and reduce noise of the output of a photo detection circuit applicable in many photo-detection apparatus, particularly, X-ray detection apparatus. Accordingly, the present disclosure provides, inter alia, a photo-detection pixel circuit, a detector panel having the same, and a method of driving the pixel circuit thereof that substantially obviate one or more of the problems due to limitations and disadvantages of the related art.

Figure 1:
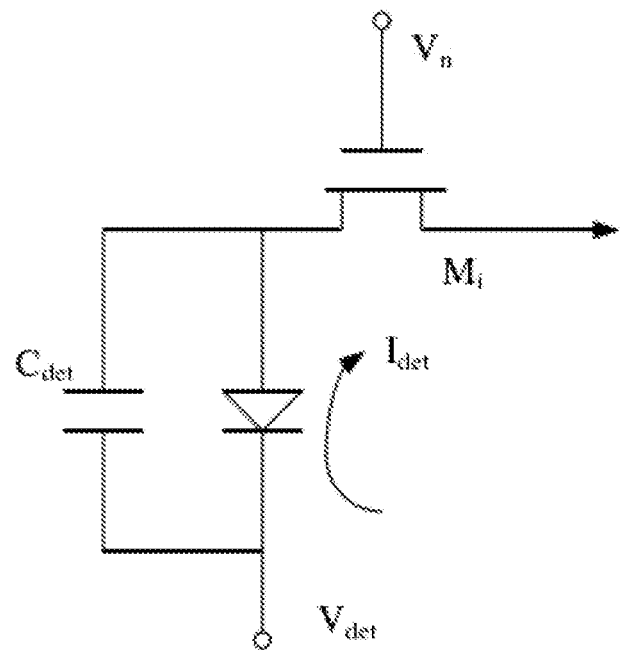
FIG. 1 is a circuit diagram of a conventional photoelectric readout circuit.
Figure 2:
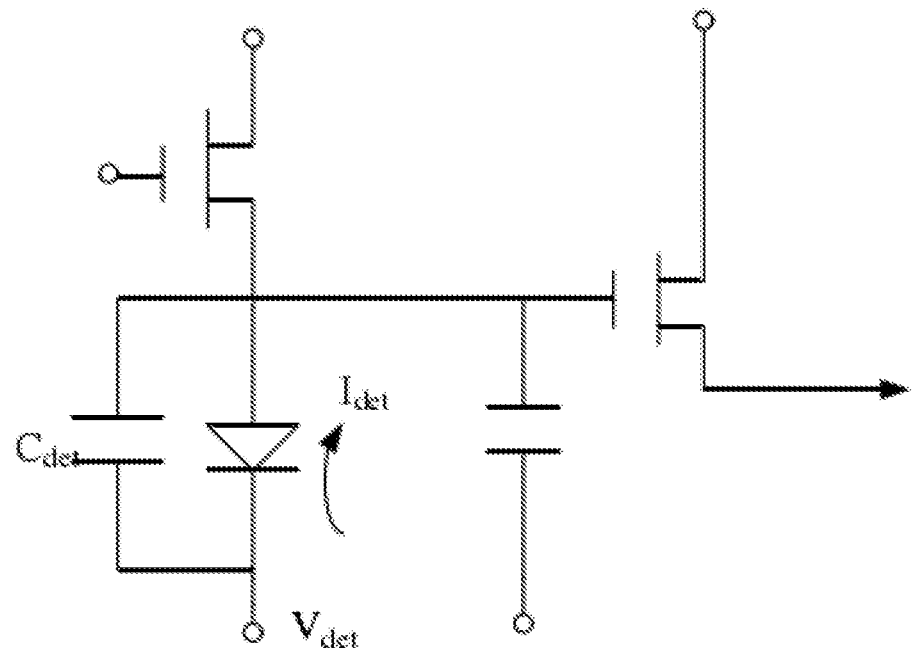
FIG. 2 is a circuit diagram of another conventional photoelectric readout circuit.
Figure 3:
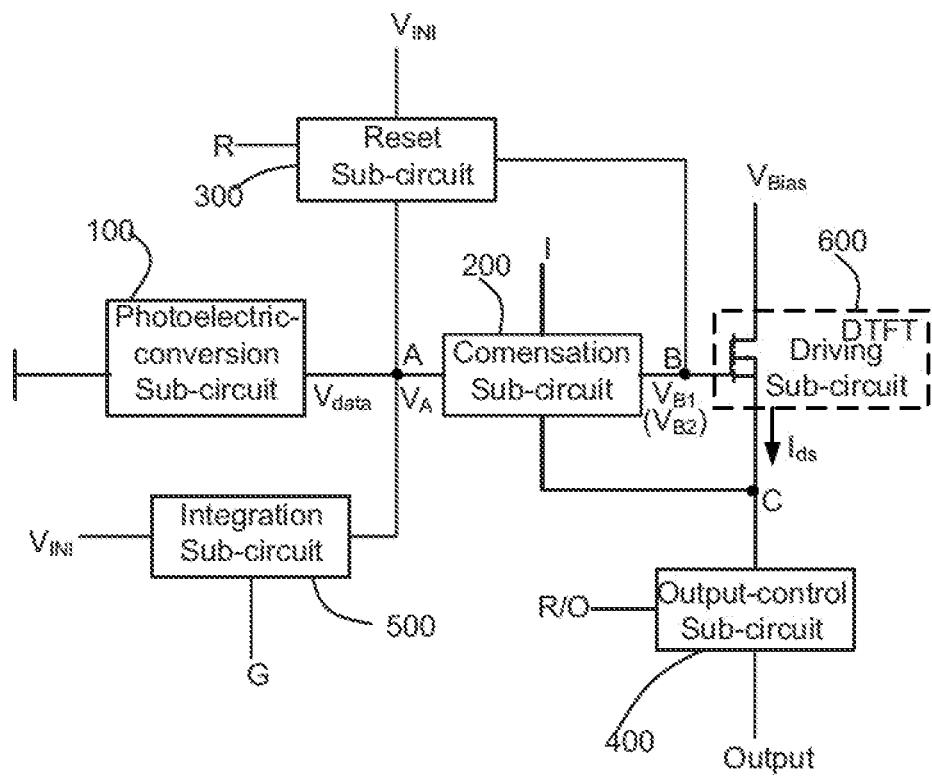
FIG. 3 is a simplified block diagram of a photo-detection pixel circuit according to some embodiments of the present disclosure.

In one aspect, the present disclosure provides a pixel circuit of a photo detector panel for generating a pixel image in a display cycle. FIG. 3 is a simplified block diagram of a photo-detection pixel circuit according to some embodiments of the present disclosure. In an embodiment, the pixel circuit is associated with one of a plurality of pixels formed on a photo detector panel used to detect electromagnetic radiation with a certain spectrum range including wavelengths of X-ray. Optionally, the pixel circuit is implemented for photo detector panel used to detect electromagnetic radiation with a certain spectrum range of infrared or ultra-violet light. In an embodiment, each pixel circuit can be operated progressively in a plurality of display cycles to detect the electromagnetic radiation. In each display cycle, it outputs a current signal based on what the electromagnetic radiation is detected. Based on the current signal outputted from the pixel circuit, a pixel image can be generated in the display cycle by a display panel coupled to the photo detector panel. Referring to FIG. 3, the pixel circuit includes a photoelectric-conversion sub-circuit 100, a compensation sub-circuit 200, a driving sub-circuit 600, a reset sub-circuit 300, an output-control sub-circuit 400, and an integration sub-circuit 500, coupled together via a first node A and a second node B. The pixel circuit is configured to receive at least a first control signal R provided to the reset sub-circuit 300, a second control signal I provided to the compensation sub-circuit 200, a third control signal G provided to the integration sub-circuit 500, and a fourth control signal provided to the output-control sub-circuit 400.

In an embodiment, the reset sub-circuit 300 is coupled to a first node A and a second node B and controlled by the first control signal R to provide an initialization voltage $V_{INI}$ or a reference voltage to the first node A and the second node B in a reset period in each display cycle.

Referring to FIG. 3, the photoelectric-conversion sub-circuit 100 is coupled to the first node A and is configured to convert an optical signal to a first voltage $V_A$ at the first node A. The optical signal may be an electromagnetic radiation with a certain spectrum range that is within a sensible range of a photo detector in the photoelectric-conversion sub-circuit 100.

The driving sub-circuit 600 includes a driving transistor DTFT. In particular, the driving transistor DTFT includes a first terminal coupled to a bias input port configured to be provided with a bias voltage $V_{Bias}$, a second terminal C coupled (indirectly) to an output port Output, and a gate terminal coupled to the second node B. Optionally, the second terminal C of the driving transistor DTFT is coupled to the output-control sub-circuit 400 which is directly coupled to the output port Output. The output-control sub-circuit 400 is configured to be controlled by a fourth control signal R/O to control an output of a current signal flowing through the driving transistor DTFT at least in an output period of each display cycle.

Referring to FIG. 3, the compensation sub-circuit 200 is coupled between the first node A and the second node B and is configured to be controlled by the second control signal I to store the first voltage $V_A$ at the first node A and connect the second node B to the second terminal C of the driving transistor DTFT in a compensation period of the display cycle to determine a second voltage $V_{B1}$ at the second node B which is depended on the bias voltage $V_{Bias}$ provided to the first terminal of the driving transistor DTFT and a threshold voltage $V_{th}$ of the driving transistor DTFT.

Further, the integration sub-circuit 500 is coupled to the first node A and controlled by a third control signal G to provide a reference voltage $V_{INI}$ to the first node A in an integration period of the display cycle to determine a third voltage $V_{B2}$ at the second node B to generate a current signal $I_{ds}$ to the output port Output in an output period of the display cycle. The current signal $I_{ds}$ is substantially independent from the threshold voltage $V_{th}$ of the driving transistor DTFT.

Figure 4:
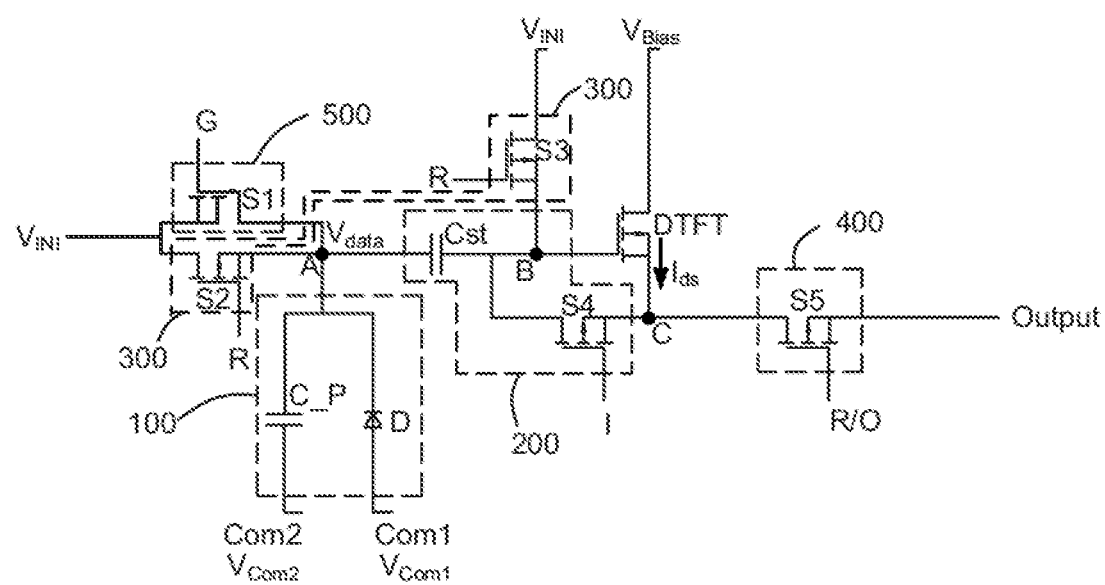
FIG. 4 is a circuit diagram of the photo-detection pixel circuit according to an embodiment of the present disclosure.

FIG. 4 shows a circuit diagram of the photo-detection pixel circuit according to a specific embodiment of the present disclosure. Referring to FIG. 4, the photoelectric-conversion sub-circuit 100 of FIG. 3 includes a photodiode D coupled between a first common voltage port Com1 and the first node A; and a pixel capacitor C_P coupled between a second common voltage port Com2 and the first node A.

In an embodiment, the first common voltage port Com1 is configured to be provided with a first common voltage $V_{Com1}$ set to be larger than the bias voltage $V_{Bias}$, and the second common voltage port Com2 is configured to be provided with a second common voltage $V_{Com2}$ set to be smaller than the bias voltage $V_{Bias}$. Optionally, the photodiode D is characterized by a light-sensitive spectrum range including wavelengths of X-ray. Optionally, the photodiode D is characterized by a light-sensitive spectrum range including wavelengths of infrared or ultraviolet light. Optionally, the photodiode D is a metal-semiconductor-metal MSM structured photodiode. The pixel capacitor C_P is added to provide a charging path when a voltage level at the first node A is too high so as to provide a protection for the photodiode D from being shorted.

In the embodiment, the photoelectric-conversion sub-circuit 100 is configured to detect an optical signal and convert the optical signal to an electrical signal and output the electrical signal as a data voltage $V_d$ at the first node A. Optionally, photodiode D has its anode coupled to the first common voltage port Com1 and its cathode coupled to the first node A. When light is shining on the photodiode D, the photodiode D becomes conductive and outputs a voltage signal, i.e., $V_{data}$, which can be stored in the storage capacitor $C_{st}$ of the compensation sub-circuit 200.

Referring to FIG. 4 again, the integration sub-circuit 500 includes a first transistor S1 having a first terminal coupled to a first voltage source configured to be supplied with the reference voltage $V_{INI}$, a second terminal coupled to the first node A, and a gate terminal configured to be controlled by the third control signal G. In an embodiment, the reference voltage is substantially the same as the initialization voltage. In an embodiment, when the third control signal G is provided with a turn-on level (e.g., a low-voltage level), the first transistor S1 can be set to a conduction state to allow the reference voltage $V_{INI}$ be applied to the first node A. In an embodiment, the reference voltage $V_{INI}$ is set to be smaller than the bias voltage $V_{Bias}$. Optionally, the third control signal G is provided as a scan signal configured to be provided row-by-row progressively through the photo-detection panel for operating each pixel circuit in each row in one display cycle.

The reset sub-circuit 300 of FIG. 3 is comprised of two transistors: a second transistor S2 and a third transistor S3, in the circuit of FIG. 4. The second transistor S2 has a first terminal coupled to a second voltage source configured to be supplied the reference voltage $V_{INI}$ as an initialization voltage, a second terminal coupled to the first node A, and a gate terminal configured to be controlled by a first control signal R. The third transistor S3 has a first terminal coupled to the same second voltage source, a second terminal coupled to the second node B, and a gate terminal configured to be controlled by the same first control signal R. In the embodiment, the second voltage source is substantially the same as the first voltage source coupled to the integration sub-circuit 500. In the embodiment, when the first control signal R is set to a turn-on level to connect the first terminal to the second terminal of the second transistor S2, the initialization voltage $V_{INI}$ can be applied from the first voltage source to the first node A, i.e., a first voltage $V_A = V_{INI}$. As the third transistor S3 is controlled by the same first control signal R at its gate and shared the same first voltage source at its first terminal with the first terminal of second transistor S2, thus at the same time, the initialization voltage $V_{INI}$ can also be applied to the second node B. In other words, both the first node A and the second node B are reset to the initialization voltage $V_{INI}$ in the reset period.

Further in FIG. 4, the compensation sub-circuit 200 comprises a fourth transistor S4 having a first terminal coupled to the second node B, a second terminal coupled to the second terminal C of the driving transistor DTFT, and a gate terminal configured to be controlled by a second control signal I; and a storage capacitor $C_{st}$ having a first terminal coupled to the first node A and a second terminal coupled to the second node B. In an embodiment, when the second control signal I is set to a turn-on level (e.g., a low-voltage level), the fourth transistor S4 is in a conduction state to allow the gate (i.e., the first node A) and the second terminal C of the driving transistor DTFT connected to each other. The driving transistor DTFT in this time becomes an effective diode device connected to the bias input port which is configured to be provided with a bias voltage $V_{Bias}$. The storage capacitor $C_{st}$ that connects to the second terminal C is able to store a threshold voltage $V_{th}$ of the driving transistor when the driving transistor becomes the effective diode device. The voltage level at the second node B now is changed to a second voltage $V_{B1}$ depending on the threshold voltage $V_{th}$ and the bias voltage $V_{Bias}$.

Furthermore in FIG. 4, the output-control sub-circuit 400 is coupled between the second terminal C of the driving transistor DTFT and the output port Output. In the embodiment, the output-control sub-circuit 400 includes a fifth transistor S5 having a first terminal coupled to the second terminal C of the driving transistor DTFT, a second terminal coupled to the output port Output, and a gate terminal configured to be controlled by a fourth control signal R/O.

In order to drive the pixel circuit of FIG. 4, all control signals mentioned above: the first control signal R, the second control signal I, the third control signal G, and the fourth control signal RIO, are needed to set to certain effective turn-on level or turn-off level in different periods of a display cycle to control the pixel circuit for detecting the optical signal and output the current signal $I_{ds}$ to the output port. In the embodiment as shown in the circuit of FIG. 4, all transistors used in the circuit are P-type transistor. Therefore, effectively a low-voltage level set for all control signals mentioned above: the first control signal R, the second control signal I, the third control signal G, and the fourth control signal R/O is a turn-on level for setting the corresponding P-type transistors to be in conduction state and a high-voltage level set for all the control signals is a turn-off level for setting the corresponding P-type transistors to be in block state.

Figure 5:
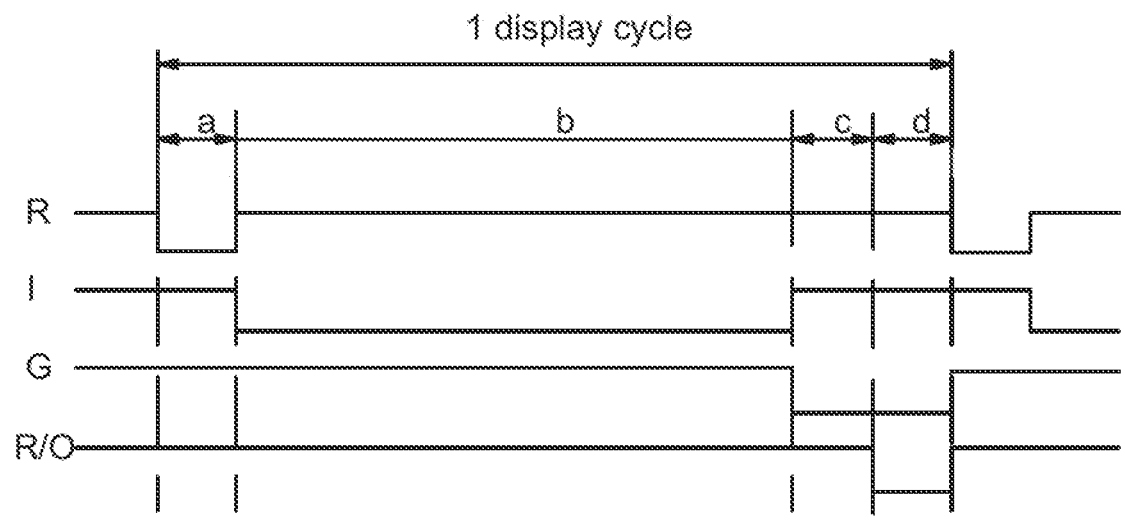
FIG. 5 is a timing waveform of control signals provided for the photo-detection pixel circuit of FIG. 4 according to an embodiment of the present disclosure.

FIG. 5 is a timing waveform of control signals provided for the photo-detection pixel circuit of FIG. 4 according to an embodiment of the present disclosure. As an example, all transistors are chosen as P-type transistors. Correspondingly, a turn-on level would be a low-voltage level for each P-type transistor and a turn-off level would be a high-voltage level. In an embodiment, FIG. 5 shows all the control signals being applied during a display cycle of the pixel circuit. In the embodiment, the display cycle is one work cycle during which a frame of pixel image is obtained based on the current signal detected by the pixel circuit.

In an embodiment, each display cycle includes at least a reset period a, a compensation period b, an integration period c, and an output period d. Optionally, the reset period can be a first period of a display cycle or a last period of the display cycle. The reset operation performed during the reset period is intended to reset the voltage level at the first node A which is coupled to the photoelectric-conversion sub-circuit and one terminal of the compensation sub-circuit and also reset the voltage level at the second node B which is coupled to another terminal of the compensation sub-circuit so that no residue voltages at the first node A and the second node B during each display cycle will affect an operation of the pixel circuit in a next display cycle.

In particular, the reset sub-circuit 300 operation is performed by setting the first control signal R in the reset period a to a turn-on level (e.g., a low-voltage level) for the second transistor S2 and the third transistor S3 to allow both the first node A and the second node B to be reset to an initialization voltage $V_{INI}$ at the same time. Referring to FIG. 4, the resetting of the first node A also discharges the pixel capacitor C_P to the initialization voltage $V_{INI}$ level. In this period, the cathode of the photodiode D is also at $V_{INI}$ while the anode of the photodiode D is given as $V_{Com1}$ supplied from a first common voltage line Com1. After the reset operation, the photodiode D is ready to discharge itself and to recharge the pixel capacitor C_P again. Also, when the first control signal R is set to a turn-off level, both the S2 and S3 are controlled to be turned off at the same time at the end of the reset period a. During the reset period a, all other control signals I, G, and R/O are set to turn-off level, i.e., high-voltage level.

In the compensation period b of the display cycle, the second control signal I is set to turn-on level, i.e., low-voltage level to make the fourth transistor S4 be in conduction state and the second terminal C to be connected with the gate terminal of the driving transistor DTFT. The DTFT forms an effective diode device. By the end of the compensation period b, the first node A (which is connected to the first terminal of the storage capacitor $C_{st}$) is loaded with the data voltage $V_{data}$ outputted from the photoelectric-conversion sub-circuit 100 by detecting an optical signal (e.g., X-ray radiation). The second node B is now charged to a second voltage $V_{B1}=V_{Bias}+V_{th}$ by the bias voltage $V_{Bias}$ provided to the bias input port. The second node B, which is connected to the gate of the driving transistor DTFT, is now connected to the second terminal C of the driving transistor DTFT through the fourth transistor S4. In this period, the photodiode D starts to chare, with its anode being provided with the first common voltage $V_{Com1}$ and its cathode being set to the initialization voltage $V_B$a, starts to charge the pixel capacitor C_P. This will change the first voltage $V_A$ of the first node A from $V_{INI}$ to a data voltage $V_{data}$ associated with the output data signal of the photodiode D.

Next, in the integration period c of the display cycle, the second control signal I becomes a turn-off level while the third control signal G is changed to a turn-on level. Therefore, the transistor S1 is in conduction state to connect its first terminal and second terminal to allow a reference voltage $V_{INI}$ to write into the first node A, changing the first voltage at the first node $V_A$ from the $V_{data}$ to $V_{INI}$. During this period, the fourth transistor S4 and the third transistor S3 are in block state so that the second node B is set to a floating state. Based on charge conservation principle across the first terminal and the second terminal of a capacitor, the voltage at the second node B is changed to a third voltage $V_{B2}=V_{INI}+V_{Bias}+V_{th}-V_{data}$.

Accordingly, in the output period d, the driving transistor DTFT is operated in saturated state as an effective diode device. Once the fourth control signal R/O is set to a turn-on level to make the fifth transistor S5 in conduction state, a driving current $I_{ds}$ is flowing from the bias input port through the driving transistor DTFT, the fifth transistor S5, to the output port Output. This driving current $I_{ds}$ can be calculated using the following formula:

$$I_{ds} = \frac{K}{2}(V_{gs} - V_{th})^2$$
$$= \frac{K}{2}(V_{INI} + V_{Bias} + V_{th} - V_{data} - V_{Bias} - V_{th})^2$$
$$= \frac{K}{2}(V_{INI} - V_{data})^2$$

Here K is a parameter associated with carrier mobility and geometric characterization factor of the driving transistor DTFT. $V_{INI}$ is a constant reference voltage level. Therefore, current signal outputted at the output port of the pixel circuit is only depended on K and the $V_{data}$ related to photoelectric conversion of the optical signal being detected by the photodiode D, but not depended on the threshold voltage $V_{th}$ of the driving transistor and the bias voltage $V_{Bias}$. Thus, the pixel circuit can be operated stably to output the current signal without being affected by RC loading of the circuit.

In an embodiment, each display cycle of a photo-detection pixel circuit (FIG. 4) includes an output period. Optionally, the output port Output of the photo-detection pixel circuit is coupled to a light-emitting device of a display panel. Only the driving current outputted in the output period d is able to drive the light-emitting device to emit light (for producing a pixel image) and not to emit light in other period of each display cycle. In this way, the display panel can substantially reduce power consumption and enhance the life of the light-emitting device. In other words, the fourth control signal RIO is set to a turn-on level only in the output period and is set to a turn-off level in all other periods including at least the reset period, the compensation period, and the integration period of each display cycle.

Figure 6:
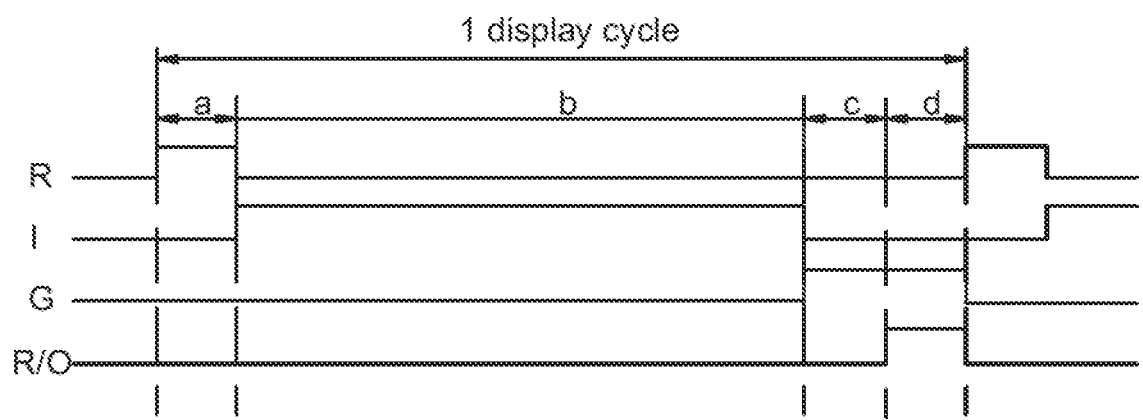
FIG. 6 is a timing waveform of control signals provided for a photo-detection pixel circuit using all N-type transistors according to an embodiment of the present disclosure.

In an alternative embodiment, all transistors in the circuit of FIG. 4 can be replaced by N-type transistors. Without changing the configuration of the circuit, all the control signals R, I, G, and R/O for N-type transistor need to be set to an opposite polarity of the corresponding control signals used for P-type transistor, as shown in a timing waveform of FIG. 6. In particular, a high-voltage level for turning on corresponding N-type transistors and a low-voltage level for turning off corresponding N-type transistors are provided to the control signals in FIG. 6 to substantially driving the corresponding photo-detection pixel circuit for achieving a same function described herein.

In another aspect, the present disclosure provides a photo detector panel comprising a base substrate and a plurality of photo-detection pixel circuits arranged in an army disposed on the base substrate, each of the plurality of photo-detection pixel circuits being the pixel circuit described herein, for example, the pixel circuit of FIG. 4. The photo detector panel provided in this disclosure is applicable to detect X-ray radiation and generate a corresponding image displayed on a display panel. Because the current signal outputted from the photo-detection pixel circuit in the detector panel is independent from the threshold voltage $V_{th}$ of the driving transistor thereof, variations in process of manufacturing different detection pixels of the photo detector panel will not affect the corresponding output signals.

In yet another aspect, the present disclosure provides a photoelectric inspection apparatus including a photo-detector panel described above which is coupled with a display panel. The display panel includes a plurality of display pixel circuits one-to-one corresponding to the plurality of photo-detection pixel circuits. Optionally, each display pixel circuit includes at least an amplifier having an input port coupled to the output port of the corresponding photo-detection pixel circuit and an output port coupled to an input port of a light-emitting device. Each display pixel circuit in the display panel receives a current signal outputted from a corresponding photo-detection pixel circuit in the photo detector panel. The amplifier is configured to process the current signal before sending it to the input port of the light-emitting device to drive the light-emitting device to emit light for displaying a pixel image on the display panel. The display panel displays an image based on each output current signal which is depended upon intensity of each corresponding optical signal detected by the photo detector panel. If the optical signals are coming from X-ray radiations through certain target object, the display panel just displays an X-ray image of the target object.

In still another aspect, the present disclosure provides a method of driving the pixel circuit described herein to readout a current signal converted from an optical signal in a display cycle. A display cycle is referred to be a work cycle of operating the pixel circuit to detect an optical signal, convert the optical signal to an electrical signal, and use the electrical signal to generate a current signal. The current signal is eventually used to produce a frame of pixel image in the work cycle as the pixel circuit serves as a unit in one of multiple rows of circuits disposed in a photo detector panel. The work cycle is one unit time of progressively scanning the whole detector panel for displaying a frame of image in a display panel. The method includes, in a reset period of the display cycle, supplying a first control signal at a turn-on level to control the reset sub-circuit to provide an initialization voltage to the first node and the second node. The method further includes, in a compensation period of the display cycle, detecting an optical signal by the photoelectric-conversion sub-circuit, converting the optical signal to a first voltage at the first node, supplying a second control signal at a turn-on level to control the compensation sub-circuit to store the first voltage and connect the second node to the second terminal of the driving transistor to induce a second voltage $V_{B1}$ at the second node. The second voltage $V_{B1}$ is depended on a bias voltage $V_{Bias}$ provided to the first terminal of the driving transistor and a threshold voltage of the driving transistor. Additionally, the method includes, in an integration period of the display cycle, supplying a third control signal at a turn-on level to control the integration sub-circuit to provide a reference voltage to the first node, inducing a third voltage $V_{B2}$ at the second node, and generating a current signal from the first terminal of the driving transistor to the second terminal of the driving transistor. The current signal is proportional to a square of a difference between the third voltage and the second voltage.

Moreover, the method includes supplying a fourth control signal at a turn-off level to make the second terminal of the driving transistor in a floating state in each of the reset period, the compensation period, and the integration period of the display cycle and supplying the fourth control signal at a turn-on level to control the output-control sub-circuit to output the current signal in an output period of the display cycle. The current signal is substantially independent from the threshold voltage of the driving transistor and the bias voltage.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel circuit of a photo detector panel for generating a pixel image in a display cycle, comprising:
   a reset sub-circuit respectively coupled to a first node and to a second node, and controlled by a first control signal to provide an initialization voltage to the first node and the second node in a reset period of the display cycle;
   a photoelectric-conversion sub-circuit coupled to the first node and configured to convert an optical signal to a first voltage at the first node;
   a driving sub-circuit comprising a bias input port configured to be provided with a bias voltage, an output port configured to output a current signal, and being controlled by a second voltage at the second node;
   a compensation sub-circuit coupled between the first node and the second node, and configured to be controlled by a second control signal to store the first voltage at the first node and connect the second node to a second terminal of the driving sub-circuit in a compensation period of the display cycle to determine the second voltage at the second node, the second voltage being depended on the bias voltage provided to a first terminal of the driving sub-circuit and a threshold voltage of the driving sub-circuit; and
   an integration sub-circuit coupled to the first node and controlled by a third control signal to provide the initialization voltage to the first node in an integration period of the display cycle to determine a third voltage at the second node to generate a current signal to the output port in an output period of the display cycle, wherein the current signal is substantially independent from the threshold voltage of the driving sub-circuit and the bias voltage;
   wherein the integration sub-circuit comprises a first transistor having a first terminal coupled to a first voltage source configured to be supplied with the initialization voltage, a second terminal coupled to the first node, and a gate terminal configured to be controlled by the third control signal, wherein the initialization voltage is set to be smaller than the bias voltage; and
   the third control signal is set to a turn-on level for the first transistor throughout the integration period and the output period of the display cycle and is set to a turn-off level for the first transistor in each of the reset period and the compensation period of the display cycle;
   wherein the bias voltage and the initialization voltage are provided by the bias input port and an initialization signal input port distinct from each other, the bias voltage and the initialization voltage being different from each other; and
   the initialization signal input port configured to provide the initialization voltage is coupled to the first node through the first transistor and a second transistor coupled in parallel, respectively.

2. The pixel circuit of claim 1, wherein the driving sub-circuit comprises a driving transistor having a first terminal coupled to the bias input port, a second terminal coupled to the output port, and a gate terminal configured to receive the second voltage.

3. The pixel circuit of claim 1, wherein the photoelectric-conversion sub-circuit comprises a photodiode coupled between a first common voltage port and the first node, and a pixel capacitor coupled between a second common voltage port and the first node; wherein the first common voltage port is configured to be provided with a first common voltage set to be larger than the bias voltage, the second common voltage port is configured to be provided with a second common voltage set to be smaller than the bias voltage.

4. The pixel circuit of claim 3, wherein the photodiode comprises a light-sensitive spectrum range including wavelengths of X-ray.

5. The pixel circuit of claim 3, wherein the photodiode comprises a light-sensitive spectrum range including wavelengths of infrared or ultraviolet light.

6. The pixel circuit of claim 1, wherein the reset sub-circuit comprises the second transistor, the second transistor having a first terminal coupled to the first voltage source configured to be supplied with the initialization voltage, a second terminal coupled to the first node, and a gate terminal configured to be controlled by the first control signal; and a third transistor having a first terminal coupled to the first voltage source, a second terminal coupled to the second node, and a gate terminal configured to be controlled by the first control signal.

7. The pixel circuit of claim 6, wherein the first control signal is set to a turn-on level for the second transistor and the third transistor in the reset period of the display cycle and is set to a turn-off level for the second transistor and the third transistor in each of the compensation period, the integration period, and the compensation period of the display cycle.

8. The pixel circuit of claim 1, wherein the compensation sub-circuit comprises a fourth transistor having a first terminal coupled to the second node, a second terminal coupled to the second terminal of the driving sub-circuit, and a gate terminal configured to be controlled by the second control signal; and a storage capacitor having a first terminal coupled to the first node and a second terminal coupled to the second node.

9. The pixel circuit of claim 8, wherein the second control signal is set to a turn-on level for the fourth transistor in the compensation period of the display cycle and is set to a turn-off level for the fourth transistor in each of the reset period, the integration period, and the output period of the display cycle.

10. The pixel circuit of claim 1, further comprising an output-control sub-circuit coupled between the second terminal of the driving sub-circuit and the output port and configured to make the second terminal of the driving sub-circuit at a floating state in each of the reset period, the compensation period, and the integration period of the display cycle and to control the current signal to be outputted in the output period of the display cycle.

11. The pixel circuit of claim 10, wherein the output-control sub-circuit comprises a fifth transistor having a first terminal coupled to the second terminal of the driving sub-circuit, a second terminal coupled to the output port, and a gate terminal configured to be controlled by a fourth control signal.

12. The pixel circuit of claim 11, wherein the fourth control signal is set to a turn-off level for the fifth transistor in each of the reset period, the compensation period, and the integration period of the display cycle and set to a turn-on level for the fifth transistor in the output period of the display cycle.

13. The pixel circuit of claim 1, wherein the display cycle comprises the reset period, the compensation period, the integration period, and output period.

14. The pixel circuit of claim 1, wherein the current signal is proportional to a square of a difference between the third voltage and the second voltage.

15. A photo detector panel comprising a base substrate and a plurality of detection pixel circuits arranged in an array disposed on the base substrate, at least one of the plurality of detection pixel circuits being the pixel circuit of claim 1.

16. A photoelectric inspection apparatus comprising a photo detector panel of claim 15 coupled with a display panel, the display panel comprising a plurality of display pixel circuits, wherein each of the plurality of display pixel circuits is configured to receive a current signal outputted from a corresponding one of the plurality of detection pixel circuits and to generate a pixel image based on the current signal.

17. The photoelectric inspection apparatus of claim 16, wherein a respective one of the plurality of display pixel circuits comprises at least an amplifier having an input port coupled to an output port of a corresponding detection pixel circuit and an output port coupled to an input port of a light-emitting device.

18. A method of driving the pixel circuit of claim 1 to readout a current signal converted from an optical signal in a display cycle, the method comprising:

in a reset period of the display cycle, supplying a first control signal at a turn-on level to control the reset sub-circuit to provide an initialization voltage to the first node and the second node;

in a compensation period of the display cycle, detecting an optical signal by the photoelectric-conversion sub-circuit; converting the optical signal to a first voltage at the first node; supplying a second control signal at a turn-on level to control the compensation sub-circuit to store the first voltage and connect the second node to the second terminal of the driving sub-circuit to induce a second voltage at the second node, the second voltage being depended on a bias voltage provided to the first terminal of the driving sub-circuit and a threshold voltage of the driving sub-circuit;

throughout an integration period of the display cycle, supplying a third control signal at a turn-on level to control the integration sub-circuit to provide the initialization voltage to the first node; inducing a third voltage at the second node; generating a current signal from the first terminal of the driving sub-circuit to the second terminal of the driving sub-circuit, the current signal being proportional to a square of a difference between the third voltage and the second voltage;

in each of the reset period, the compensation period, and the integration period of the display cycle, supplying a fourth control signal at a turn-off level to make the second terminal of the driving sub-circuit in a floating state; and in an output period of the display cycle, supplying the fourth control signal at a turn-on level to control an output-control sub-circuit to output the current signal, wherein the current signal is substantially independent from the threshold voltage of the driving sub-circuit and the bias voltage.

* * * * *